Dec. 5, 1944.  C. M. HAYGOOD  2,364,527
AIRCRAFT CATCHING APPARATUS
Filed April 13, 1943  3 Sheets-Sheet 1
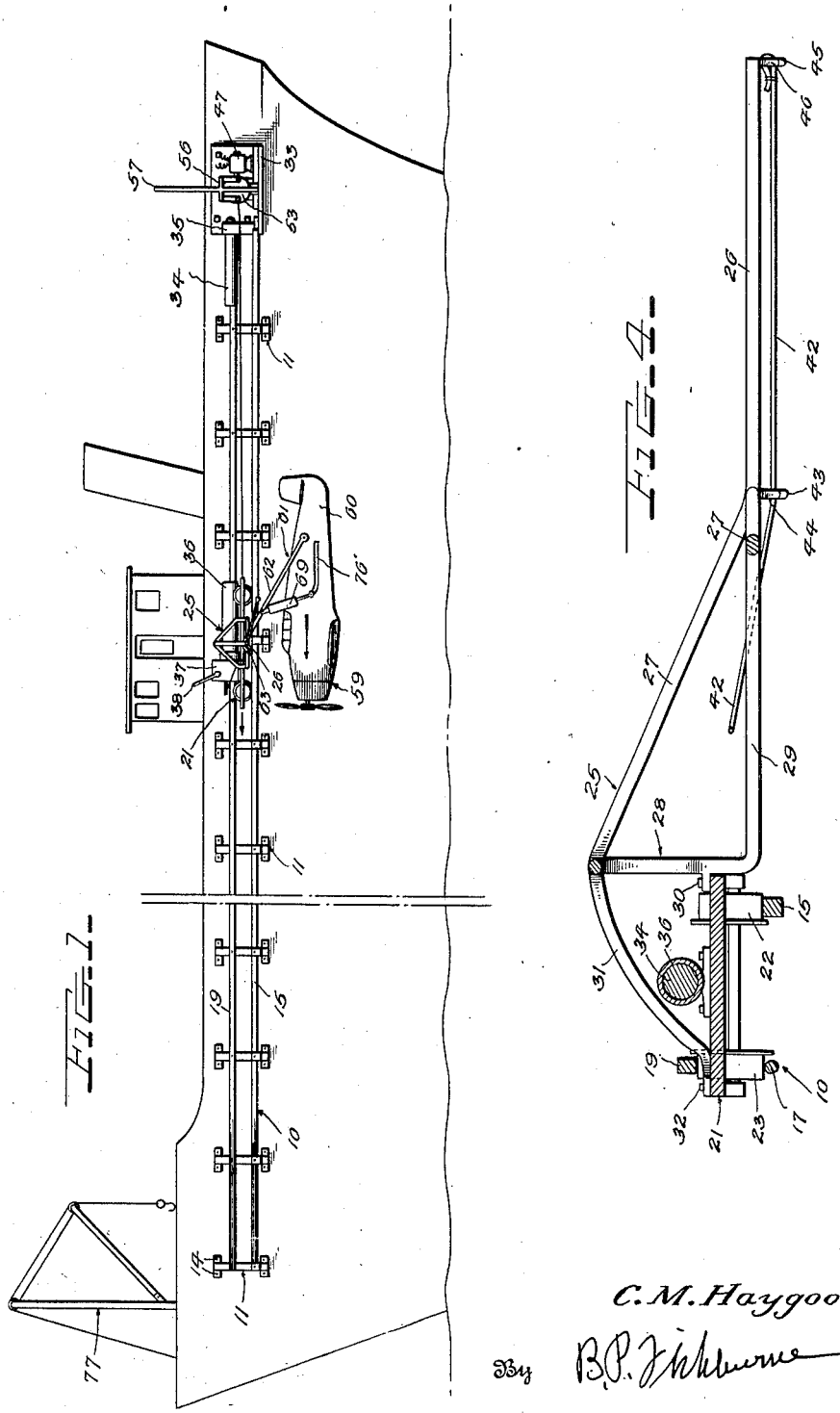
Inventor
C. M. Haygood.
By B. P. Fishburne
Attorney Dec. 5, 1944.   C. M. HAYGOOD   2,364,527
AIRCRAFT CATCHING APPARATUS
Filed April 13, 1943   3 Sheets-Sheet 2
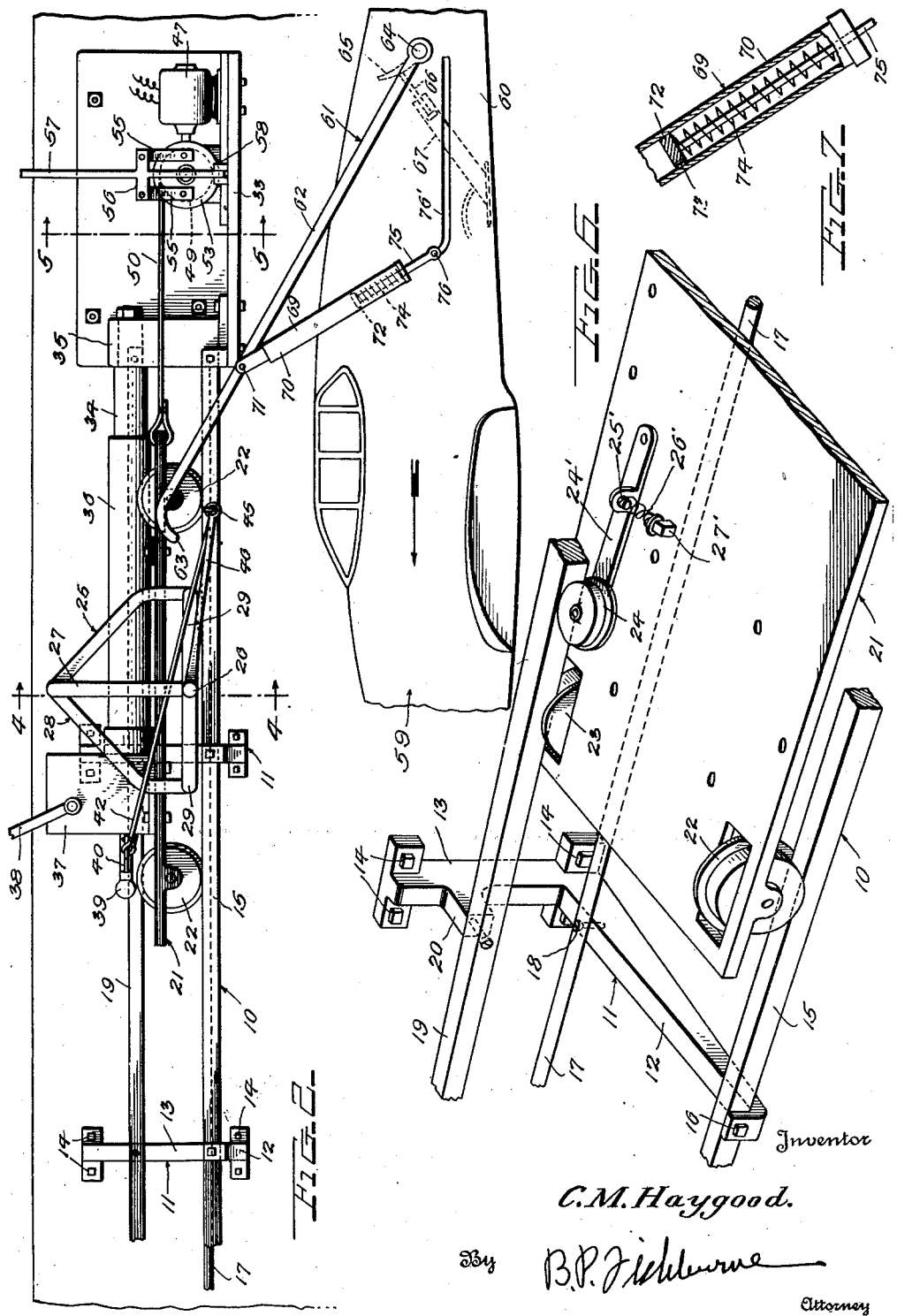
Inventor
C. M. Haygood.
By B. P. Fishburne
Attorney

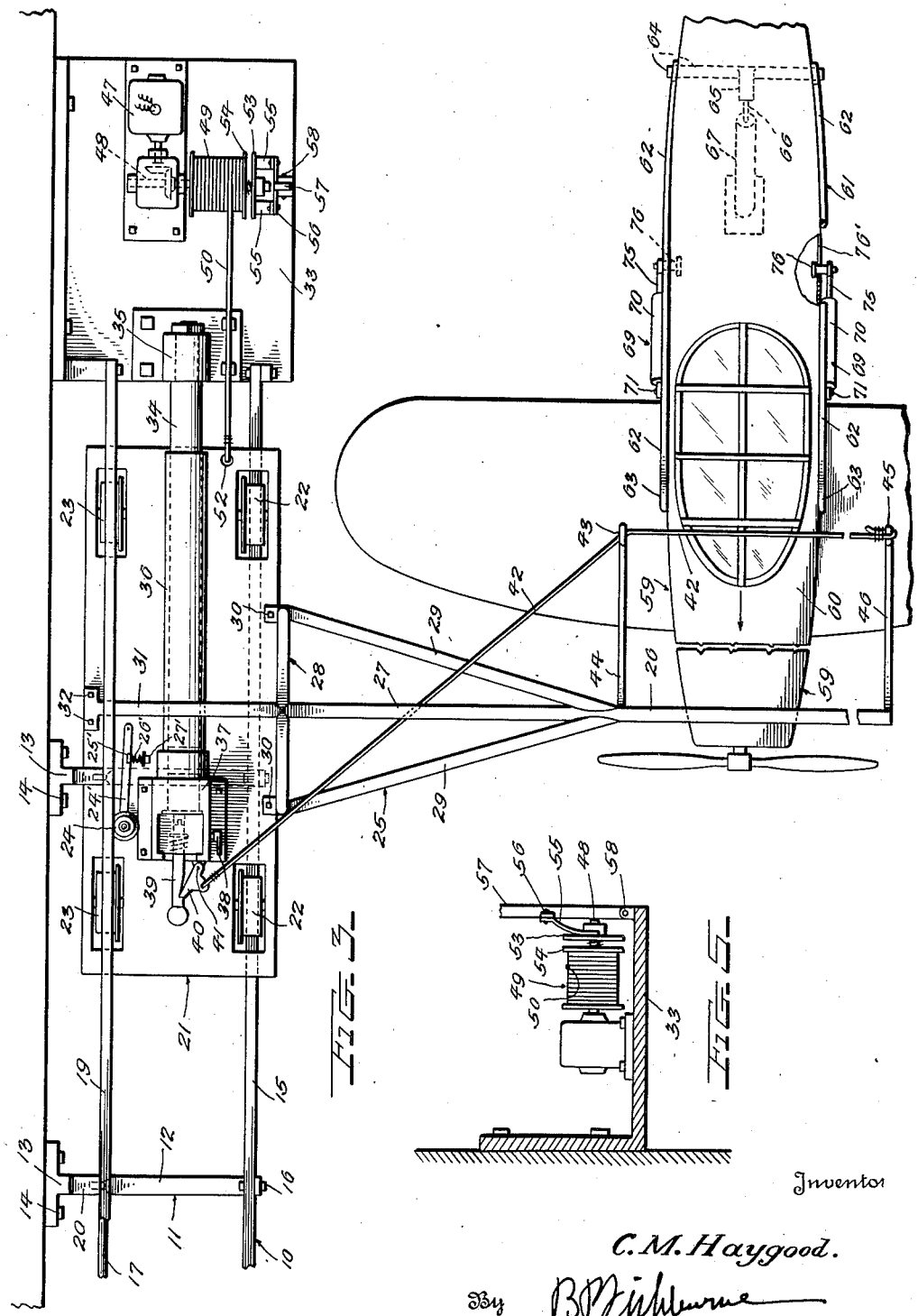

Patented Dec. 5, 1944

2,364,527

UNITED STATES PATENT OFFICE 2,364,527

AIRCRAFT CATCHING APPARATUS

Carroll M. Haygood, Cheyenne, Wyo.

Application April 13, 1943, Serial No. 482,894

9 Claims. (Cl. 244—110)

My invention relates to means for providing vessels, such as merchant vessels and troop transports with escort aircraft, and has particular reference to means for picking up an aircraft, during flight, so that it may be transferred to the vessel, to be again launched when desired.

An important object of the invention is to provide means to catch the aircraft in flight, without undue shock, and subsequently bring the same to rest.

A further object of the invention is to propel the movable support in the direction of travel of the aircraft before or about the time that the aircraft is attached to the support.

A further object of the invention is to provide means to propel the support which is automatically set into action by the aircraft as it approaches or reaches the attaching position with the support.

A further object of the invention is to provide brake means to gradually slow down and stop the travel of the support in the direction of travel of the aircraft.

A further object of the invention is to provide a catching or landing device carried by the aircraft and which is retractable.

A further object of the invention is to provide means to raise the catching or landing device mounted upon the aircraft.

A further object of the invention is to provide shock absorbing means for the catching or landing device.

Other objects and advantages of the invention will be apparent during the course of the following description.

In the accompanying drawings forming a part of this application and in which like numerals are employed to designate like parts throughout the same, Figure 1 is a side elevation of an aircraft pick-up apparatus embodying my invention, showing the same applied to a merchant ship or the like.

Figure 2 is a side elevation of the apparatus, parts being broken away, showing an aircraft in the act of landing or being picked up, Figure 3 is a plan view, corresponding to Figure 2, Figure 4 is a transverse section taken on line 4—4 of Figure 2, Figure 5 is a transverse section taken on line 5—5 of Figure 2, Figure 6 is a fragmentary perspective view of the car and track and associated elements, and Figure 7 is a detailed section through a strut shock absorbing device.

As more clearly shown in Figure 1, a track 10 is mounted upon the side of the vessel, at a suitable elevation for providing a proper clearance above the water, such as 20 feet. This track extends substantially from the stern to the bow of the vessel. The track includes L-shaped brackets 11, Figures 2, 3 and 6, including horizontal arms 12 and vertical arms 13. The vertical arms are rigidly secured to the side of a vessel by bolts 14 or other suitable means. The track further comprises an outer horizontal rail 15, rigidly secured to the horizontal arms 12, as shown at 16. The track includes a companion rail 17, also rigidly secured to the horizontal arms 12 at 18. The rail 17 is primarily used as a guide for the car, as the weight of the car does not rest upon this rail, as will be apparent. The numeral 19 designates an upper rail rigidly secured to the extensions 20 of the arms 13.

The numeral 21 designates a car or carriage having flanged wheels 22 and 23. The wheels 22 travel upon the rail 15 while the wheels 23 travel upon the rail 17. The wheels 23 are arranged beneath the upper rail 19 and engage therewith, as shown. A horizontal flanged wheel 24 is mounted upon the top of the carriage 21 and engages with the inner face of the top rail 19, as shown. This wheel 24 is carried by a swinging arm 24', pivoted at 25ª. This arm carries a lug 25', held within one end of a spring 26', receiving in its opposite end a lug 26ª, carried by a stationary support 27', rigidly mounted upon the car 21. The spring 26' serves to force the wheel 24 against the rail 19, to overcome the tendency of the front wheel 23 to bind against the rail 19, caused by the braking action at the rear of the carriage.

An aircraft catching unit 25 is rigidly mounted upon the car or carriage, and projects laterally and outwardly beyond the same for a suitable distance, to provide a proper clearance between the track and the aircraft to be picked up. The catching unit, Figure 4, includes a horizontal arm 26, having an inclined portion 27, next to the vessel. This inclined portion is rigidly connected with an arch 28, the lower ends of which are rigidly connected with outwardly converging arms 29, the outer ends of which are rigidly secured to the horizontal arm 26. The arch 28 is attached at its bottom with the car or carriage 21, as shown at 30. Rigidly secured to the top of the arch 28 is a downwardly inclined arm 31, rigidly secured to the car or carriage 21 near its opposite longitudinal edge, as shown at 32. Any other suitable means may be employed to rigidly mount the arm 26 upon the car or carriage.

Disposed adjacent to the stern of the vessel is a platform 33, rigidly secured to the side of the vessel and also rigidly secured to the ends of the rails 15, 17 and 19.

Means are provided to project or propel the car or carriage 21 forwardly, including a stationary plunger 34, rigidly mounted upon a block 35, in turn rigidly secured to the platform 33. This plunger is horizontal and is arranged in alinement with a cylinder or barrel 36, and is adapted to enter this cylinder. The cylinder or barrel 36 is rigidly mounted upon a breech chamber 37 included in a conventional breech mechanism, for receiving a cartridge containing and explosive charge. The breech chamber is rigidly mounted upon the car or carriage 21. The breech mechanism includes any suitable means 38 whereby the cartridge may be inserted therein and ejected therefrom after firing. 39 is a spring actuated firing pin, held in the retracted position by a pivoted dog 40, having detachable engagement therewith. This dog is pivoted at 41, upon the breech chamber 37.

Connected with the pivoted dog 40 is a lanyard cord 42, passed through an eye 43, carried by a horizontal arm 44 and secured to an eye 45 carried by a companion horizontal arm 46. These arms are arranged at a right angle to the arm 26 and are rigidly mounted upon the arm 26. The arms 44 and 46 are suitably spaced to provide clearance for the hooking or landing device.

Mounted upon the platform 33 is a motor 47, driving a horizontal shaft 48, having a drum 49 rigidly mounted thereon. This drum has a cable 50 wound thereon and this cable is attached to the rear end of the car or carriage 21, shown at 52. Brake means are provided for coaction with the drum 49, including a non-rotatable disk 53, slidable upon the shaft 48 and arranged to have frictional engagement with a disk 54, rigidly secured to the drum 48 for rotation therewith. The disk 53 is connected with leaf springs 55, in turn connected with a transverse bar 56, carried by a lever 57, pivoted at its lower end at 58. It is thus seen that by swinging the lever 57 toward the drum 49, the disk 55 will engage the disk 54, and have a braking action therewith to slow down and stop the drum 49.

The numeral 59 designates an aircraft, such as an aeroplane, of any well known or preferred type. This aircraft includes a fuselage 60.

The fuselage is provided with a catching or landing device 61 including arms 62 having hooks 63. The arms 62 are rigidly mounted upon a rock shaft 64, suitably mounted upon the fuselage 60 and extending transversely thereof. Hydraulic means is provided to raise the arms 62 to the elevated or catching position. This means includes a crank 65, rigidly secured to the rock shaft 64 and contacting with a plunger rod 66 of the hydraulic lift mechanism 67 which is rigidly mounted upon the fuselage. The crank 65 slidably contacts with the rod 66 but is not connected with the plunger rod 66 and hence the arms 62 are free to swing upwardly when they engage the arm 26. Each arm 62 is provided with a shock absorbing diagonal strut 69, including a cylinder 70, pivoted to the arm 62, at 71. Mounted within the cylinder 70 is a plunger 72 having a contracted port 73 and a spring 74 beneath it. The plunger is connected with a rod 75. The cylinder 69 is filled to a given level with hydraulic fluid which must pass back and forth to the restricted aperture 73, from one side to the other of the plunger 72, thus forming a shock absorbing cushion. The rods 75 are rigidly connected at their free ends with headed bolts 76, operating within elongated horizontal slots 76 formed in the fuselage and engaging the forward ends of the slots when the arms 62 are raised and moving toward the rear end of the slots when the arms 62 are retracted.

Mounted upon the vessel near or at its stern is a crane 77, disposed for connection with the aircraft when it is brought to rest at the forward end of the track.

The operation of the apparatus is as follows:

When the aircraft is to be caught or landed, the car or carriage 21 is shifted to the rear position, adjacent to the platform 33. This is effected by driving the motor 47 so that the cable 50 will be wound upon the drum 49. As the carriage approaches the rear end of its travel, plunger 34 enters the cylinder or barrel 36. The cartridge is now introduced into the breech chamber 37 and the breech mechanism is therefore loaded and closed and the firing pin 39 is retracted and is held in the retracted or cocked position by the dog 40. The lanyard cord may be elastic throughout a part or all of its length. This lanyard cord will yield sufficiently when engaged by the catching or landing device before the catching or landing device engages the arm 26. The catching device 61 is now adjusted so that the arms 62 are raised and are held in the catching position. The aircraft approaches the vessel at the stern and flies longitudinally of the side of the same in a forward direction and is guided in its flight so that the arms 62 will be free to pass over that portion of the lanyard cord between the eyes 43 and 45 and the arms will subsequently pass over the arm 26 and will be held thereon by the hooks 63. The shock absorbing struts 69 will absorb excessive shocks when the arms 62 contact with the arm 26. When the arms 62 engage the lanyard cord 72, as stated, this cord pulls the pawl 40 out of engagement with the firing pin and the cartridge is discharged. The pressure generated within the cylinder or barrel 36 reacting against the stationary plunger 34, projects or propels the car or carriage 21 forwardly in the direction in which the aircraft is flying. At about the time that the arms 62 engage the arm 26 to be hooked thereon, the car or carriage 21 is being propelled or projected forward at about the speed of the aircraft. This renders it possible for the aircraft to be caught upon the arm 26 without excessive shocks or strains. As the carriage or car 21 approaches the end of its travel, the lever 57 is manipulated to cause the disk 53 to frictionally engage the disk 54, whereby the forward travel of the car or carriage is gradually reduced until it is brought to rest at the end of its forward movement. When the carriage is brought to rest the crane 77 is manipulated to remove the aircraft from the arm 26 and place the same upon the deck of a vessel or upon a catapult. This completes the cycle of operation.

The arms 62 are pivotally mounted upon the fuselage 60, to swing vertically with relation thereto, and the shock absorbing strut 69 yieldingly opposes the rearward swinging movement of the arms beyond their normal raised position. The device 67 swings the arms to the normal raised position, at which time the headed bolts 76 engage within the forward upturned ends of the slots 76', and are held therein. When the fluid is exhausted from the device 67, the arms 62 return to the generally horizontal retracted position and the bolts 76 approach the rear ends of the slots. Any releasable means (not shown) may be employed to retain the arms 62 in the retracted position, during the normal flight of the aircraft.

While I have shown the use of an explosive charge to propel the car forwardly, I may use compressed air, a spring, or other means for this purpose.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In an aircraft catching apparatus, an arm to be mounted upon a vessel, an aircraft having an elongated guide extending longitudinally thereof, a catching device pivotally mounted upon the aircraft and having a hooked end to engage over the arm, a diagonal shock absorbing strut device connected with the catching device and having a part operating within the elongated guide, and means to raise the catching device.

2. In an aircraft catching apparatus, an arm to be mounted upon a vessel, an aircraft, a catching device pivotally mounted upon the aircraft and having a hooked end to engage the arm, a part to raise the catching device, means to move the part and free from connection therewith so that the part may move from the means, and shock absorbing means connected with the catching device to oppose the movement of the same caused by its engagement with the arm.

3. The combination with a vessel, of a track mounted upon the vessel and extending longitudinally of the same, a carriage to travel upon the track, a generally horizontal arm mounted upon the carriage and extending laterally beyond the carriage and vessel, an aircraft, an arm extending generally longitudinally of the aircraft and pivotally connected therewith to swing vertically, said arm when raised having its free end disposed above the aircraft, said arm when raised being vertically inclined and extending upwardly in a forwardly direction, said arm having its free end bent downwardly to provide a hook, and yielding means connected with the pivoted arm between its ends and with the aircraft and serving to oppose the upward swinging movement of the arm, the arrangement being such that the pivoted arm is adapted to engage over the first named arm so that the aircraft is suspended from the carriage.

4. The combination with a vessel, of a track mounted upon the vessel and extending longitudinally of the same, a carriage to travel upon the track, means to prevent the carriage from turning upon its longitudinal axis, an arm mounted upon the carriage and extending laterally beyond the same, and aircraft having a fuselage, a catching arm extending generally longitudinally of the fuselage and having its trailing end pivotally connected with the fuselage, said catching arm extending above the fuselage when raised to assume an inclined position extending upwardly in a forwardly direction, said catching arm being provided at its leading end with a forwardly facing and downwardly extending hook, a diagonal shock-absorbing strut device connected with the catching arm between its ends and connected with the fuselage, and means to raise the catching arm.

5. The combination with a vessel, of substantially horizontal brackets disposed outwardly of the sides of the vessel and attached thereto, inner and outer lower rails mounted upon the brackets and extending longitudinally of the vessel, an upper inner rail mounted upon the brackets and extending longitudinally of the vessel, a carriage, wheels supporting the carriage and engaging the inner and outer lower rails, the inner wheels engaging the upper inner rail, a transverse arm extending outwardly of the carriage, and having an inner inclined portion, an arch rigidly mounted upon the carriage and attached to the inclined portions, outwardly converging arms secured to the arch and attached to the first-named arm adjacent to the inclined portion, an aircraft having a fuselage, an arm extending generally longitudinally of the fuselage, means pivotally connecting the trailing end of the arm with the fuselage to swing in a vertical plane, the catching arm having its forward end bent downwardly and when raised extending above the fuselage, a diagonal shock absorbing strut device connected with the catching arm between its end and also connected with the fuselage, and means to raise the catching device.

6. The combination with a vessel, of a track mounted upon the vessel and extending longitudinally of the same, a carriage to travel upon the track, a cylinder mounted upon the carriage, a support fixed to the vessel, a plunger attached to the support and arranged to enter the rear end of the cylinder, the plunger moving out of the cylinder and being separated from the same when the carriage travels forwardly, the forward travel of the carriage being effected by fluid pressure within the cylinder, a transverse arm mounted upon the carriage, an aircraft including a fuselage, and a catching arm mounted upon the fuselage to engage with the first named arm.

7. The combination with a vessel, of a track mounted upon the same and extending longitudinally thereof, a carriage to travel upon the track, a cylinder mounted upon the carriage, a fixed support, a stationary plunger mounted upon the fixed support and arranged to enter the cylinder, the plunger being removed from within the cylinder and separated from the cylinder when the carriage travels forwardly, the forward travel of the carriage being effected by fluid pressure within the cylinder, a drum, a cable attached to the carriage and wound upon the drum, a motor to rotate the drum to wind up the cable, a brake device to control the rotation of the drum when the cable is being paid out, an arm mounted upon the carriage, an aircraft, and a catching device mounted upon the aircraft to engage with the arm.

8. The combination with a vessel, of a track mounted upon the same and extending longitudinally thereof, a carriage to travel upon the track, a cylinder mounted upon the carriage, a fixed support, a stationary plunger mounted upon the fixed support, and arranged to enter the cylinder, the plunger being removed from within the cylinder and separated from the cylinder when the carriage travels forwardly, a breech chamber secured to the cylinder, a firing pin for the breech chamber, a transverse arm mounted upon the carriage, longitudinal arms secured to the transverse arm and spaced from each other and extending rearwardly of the transverse arm, a flexible element secured to one longitudinal arm and slidably engaging the other longitudinal arm and serving to actuate the firing pin, an aircraft having a fuselage, a catching arm pivotally mounted upon the fuselage and extending above same, yielding means to oppose the movement of the catching arm in one direction, the arrangement being such that the catching arm will first engage the flexible element and move it toward the first named arm after which the catching arm is suspended upon the first named arm.

9. In an aircraft catching apparatus, a transverse rock shaft to be mounted upon the fuselage of the aircraft, catching arms disposed upon opposite sides of the fuselage and mounted upon the rock shaft, sid arms extending longitudinally of the fuselage and having their free ends bent downwardly and arranged in a leading position, such free ends extending above the fuselage when the catching arms are raised, a diagonal yielding device connected with each catching arm between its ends and with the fuselage, a crank rigidly secured to the rock shaft, and a plunger engaging the crank to shift it in one direction and free from connection therewith so that the crank may move from the plunger.

CARROLL M. HAYGOOD.